United States Patent
Lyons, Jr.

(10) Patent No.: US 6,735,003 B1
(45) Date of Patent: May 11, 2004

(54) METHOD AND APPARATUS FOR REDUCING ARTIFACTS IN AN IMAGING SYSTEM

(75) Inventor: Joseph R. Lyons, Jr., Wilmington, MA (US)

(73) Assignee: Agfa Corporation, Wilmington, MA (US)

( * ) Notice: Subject to any disclaimer, the term of this patent is extended or adjusted under 35 U.S.C. 154(b) by 505 days.

(21) Appl. No.: 09/182,404

(22) Filed: Oct. 29, 1998

(51) Int. Cl.[7] .............................................. G02B 26/08
(52) U.S. Cl. ........................ 359/196; 359/197; 359/198; 359/199; 359/200; 359/201; 359/202; 359/203; 359/204; 359/205; 359/206; 359/207; 359/208; 359/209; 359/210; 359/211; 359/212; 359/213; 359/214; 359/215; 359/216; 359/217; 359/218; 359/219; 359/220; 359/221; 359/222; 359/223; 359/224; 359/225; 359/226; 358/474; 358/493; 358/497; 347/260
(58) Field of Search ................................ 359/196, 197, 359/198, 199, 200, 201, 202, 203, 204, 205, 206, 207, 208, 209, 210, 211, 212, 213, 214, 215, 216, 217, 218, 219, 220, 221, 222, 223, 224, 225, 226; 358/474, 497, 493; 347/260, 243, 223

(56) References Cited

U.S. PATENT DOCUMENTS

| | | | | |
|---|---|---|---|---|
| 4,834,520 A | * | 5/1989 | Klainman | 359/218 |
| 5,589,973 A | | 12/1996 | King et al. | 359/214 |
| 5,598,739 A | | 2/1997 | Blake et al. | 74/89 |
| 5,671,005 A | | 9/1997 | McNay et al. | 347/262 |
| 5,771,055 A | * | 6/1998 | Aiba et al. | 347/134 |

* cited by examiner

Primary Examiner—Audrey Chang
Assistant Examiner—Craig Curtis
(74) Attorney, Agent, or Firm—John A. Merecki; Robert A. Sabourin

(57) ABSTRACT

A method and apparatus for reducing artifacts in an imaging system by directing a stream of air onto the beam deflection assembly of the imaging system. An air displacement system, such as a fan assembly or the like, is oriented to direct, a stream of air onto the rotating deflector element of the beam deflection assembly. The stream of air is positioned to distribute a substantially uniform amount of air around the rotating deflector element.

15 Claims, 3 Drawing Sheets

METHOD AND APPARATUS FOR REDUCING ARTIFACTS IN AN IMAGING SYSTEM

FIELD OF THE INVENTION

The present invention is in the field of imaging systems. More particularly, the present invention provides a method and apparatus for reducing artifacts in an imaging system by directing a stream of air onto and around the beam deflection assembly of the imaging system.

BACKGROUND OF THE INVENTION

In many imaging systems, such as imagesetters or platesetters, an optical carriage is used to displace a laser system or other imaging source in a slow scan direction along an internal drum to expose a supply of recording media supported on the drum. Generally, the imaging source includes a beam deflection assembly, comprising a deflector element (e.g., a mirror) and a spin motor for rotating the deflector element, for deflecting an imaging beam generated by a radiation source across the recording media. Such an imaging system is described, for example, in U.S. Pat. No. 5,598,739, assigned to the Agfa Division, Bayer Corporation, incorporated herein by reference.

Increased speed and productivity is essential in deadline driven printing businesses, such as newspapers and the like. Accordingly, many attempts have been made to increase the imaging speed and throughput of imaging systems used by these and other businesses. One method of increasing the imaging speed involves the use of ever faster spin motors. Unfortunately, the use of faster spin motors often results in the generation of undesirable artifacts, such as banding, in the recorded image.

SUMMARY OF THE INVENTION

The present invention provides a method and apparatus for reducing artifacts in an imaging system by directing a stream of air onto the beam deflection assembly of the imaging system. In a first, preferred embodiment, the present invention provides a fan assembly oriented to direct a stream of air onto the rotating deflector element of the beam deflection assembly. The stream of air is preferably positioned to distribute a substantially uniform amount of air around the rotating deflector element. It is believed that the stream of air produced by the fan assembly reduces artifacts in the recorded image by changing the thermal gradients around the rotating deflector element, thereby cooling the rotating deflector element, and/or by maintaining a turbulent air flow around the rotating deflector element. Other air displacement systems for developing and directing a stream of air onto the rotating deflector element of the beam deflection assembly may also be used without departing from the intended scope of the present invention. Such systems may include, for example, an air compressor system for producing and directing a stream of compressed air onto the rotating deflector element.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
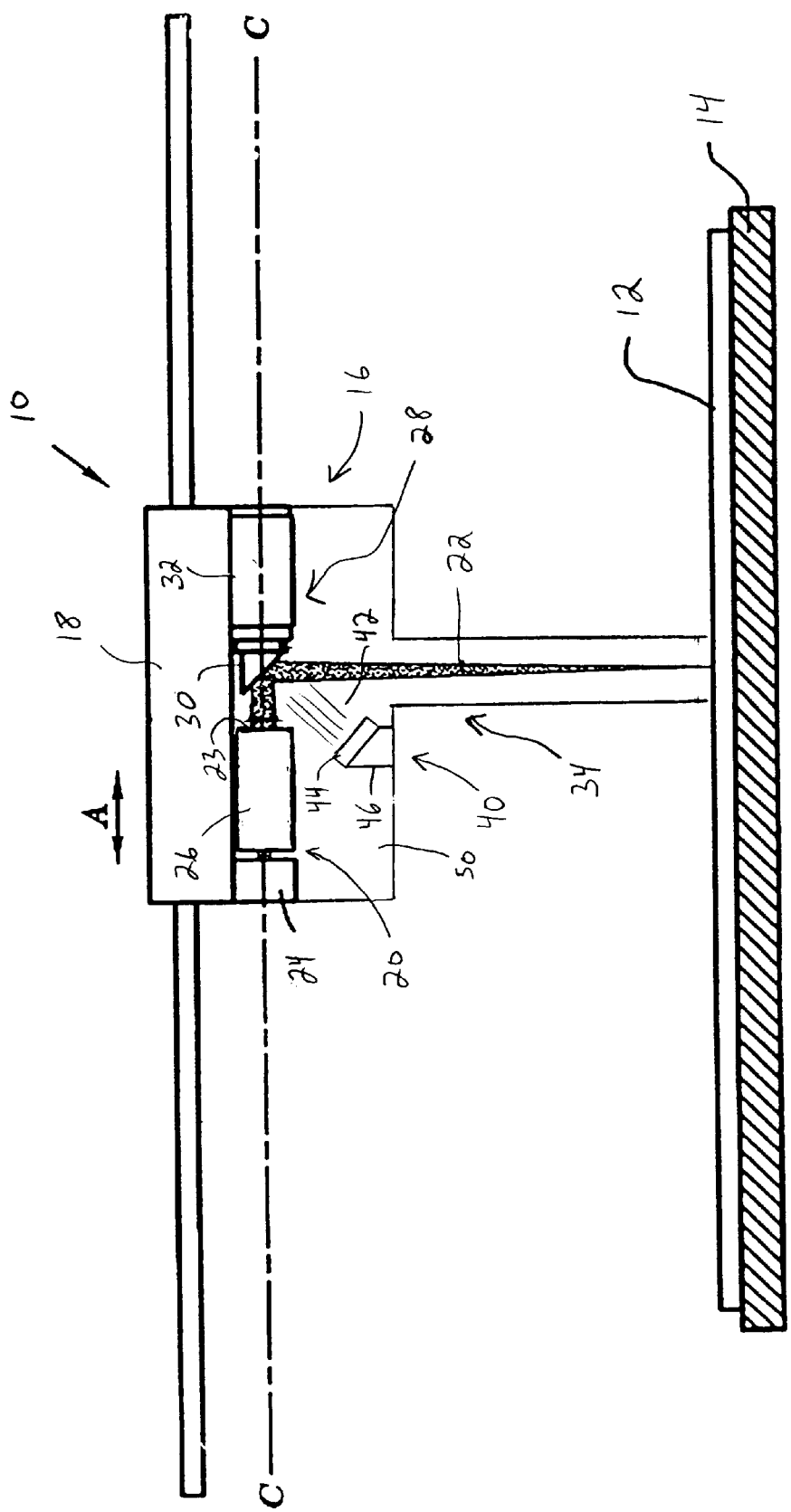
FIG. 1 illustrates an imaging system including a fan assembly in accordance with a preferred embodiment of the present invention.

The features and advantages of the present invention are illustrated in detail in the accompanying drawings, wherein like reference numerals refer to like elements throughout the drawings.

Figure 2:
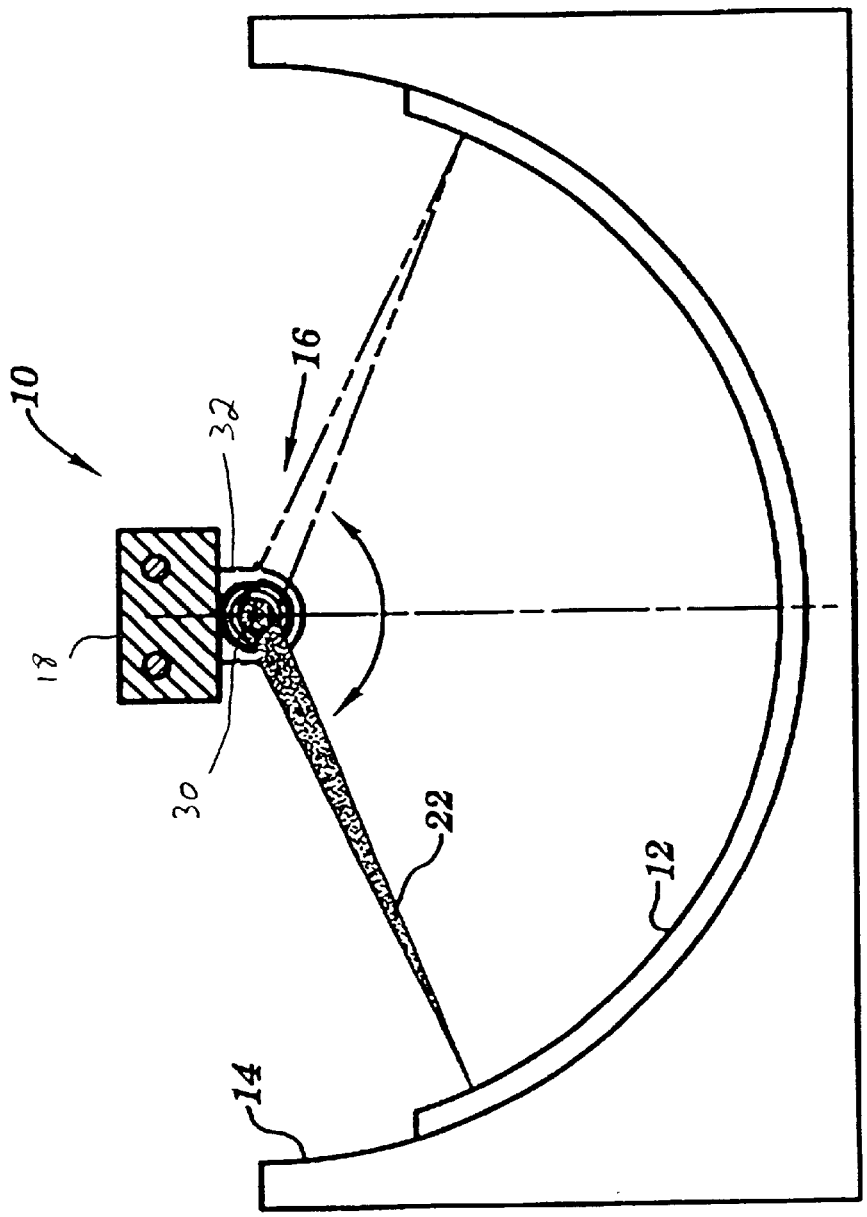
FIG. 2 is a partial cross-sectional view of the imaging system of FIG. 1.

Referring to FIGS. 1 and 2, an imaging system, generally designated as 10, supports a supply of a photosensitive, radiation sensitive, thermally sensitive, or other type of recording media 12 on an imaging surface 14. The imaging system 10 may comprise an imagesetter, platesetter, or other type of imaging system. As illustrated, the imaging surface 14 has a cylindrical configuration commonly used in internal drum type imagesetters. Alternately, the imaging surface may comprise, for example, a flat platen, a capstan roller, an external drum, or other known imaging surfaces. In the following example, the imaging system 10 is described as including a laser system for exposing a supply of photosensitive, radiation sensitive, thermally sensitive, or other type of suitable recording media supported on an internal drum.

The imaging system 10 includes an imaging source 16 carried by a movable optical carriage 18. The optical carriage 18 is displaced in a slow scan direction as indicated by directional arrow A to expose the recording media 12 in a line-wise manner. The optical carriage 18 is preferably displaced by an onboard drive system (not shown), although an external drive system may also be used.

The imaging source 16 includes a laser system 20 for generating an imaging beam 22. The laser system 20 comprises a light or radiation source 24 for producing the imaging beam 22, and an optical system 26 positioned between the radiation source 24 and the imaging surface 14 for focusing the imaging beam 22 onto the recording media 12. The imaging beam 22 exits the optical system 26 through a spot focusing lens 23. The imaging source 16 further includes a beam deflection assembly 28 for deflecting the imaging beam 22 across the recording media 12 in a fast scan direction (see FIG. 2) to record a scan line on the recording media 12. The beam deflection assembly 28 comprises a deflector element 30 (e.g., a mirror) and a spin motor 32 for rotating the deflector element 30 about an axis c. As the deflector element 30 is rotated by the spin motor 32, the imaging beam 22 is scanned across the recording media 12 as shown in FIG. 2, thereby imaging a scan line on the recording media 12.

The imaging beam 22 is shielded by a shield assembly 34 as it passes from the imaging source 16 to the recording media 12. The shield assembly 34 may comprise, for example, a radial shield pair, or "clam shell," such as that disclosed in U.S. Pat. Nos. 5,589,973 and 5,671,005, assigned to the Agfa Division, Bayer Corporation, incorporated herein by reference. The imaging beam 22 is protected between the two halves of the shield assembly 34 from thermal currents and various other conditions which could cause deleterious beam deflections. The shield assembly 34 also serves to contain the imaging beam 22 thereby preventing stray reflections which could cause unwanted exposure of the recording material 12.

As described above, the throughput of the imaging system 10 can be increased by increasing the imaging speed of the system through the use of a faster spin motor 32. For example, currently available imaging systems commonly use spin motors that are capable of spinning at 45,000 rpm or greater. However, it has been discovered that the use of a faster spin motor 32 often results in the generation of undesirable artifacts, such as banding, in the image recorded on the recording media 12 by the imaging system 10. The present invention reduces such artifacts in the recorded image by directing a stream of air or other gas onto the rotating deflector element 30 of the beam deflection assembly 28.

In accordance with the preferred embodiment of the present invention, a fan assembly 40 is used to produce and direct a stream of air 42 onto the rotating deflector element 30 of the beam deflection assembly 28. As illustrated in FIG. 1, the fan assembly 40 comprises a fan 44 and a blower box 46. The blower box 46 supports a fan motor assembly (not shown) for rotating the fan 44 and includes an opening for drawing in air. Preferably, the fan 44 is positioned to distribute a substantially uniform amount of air around the rotating deflector element 30. The blower box 46 additionally supports and aligns the fan 44 toward the rotating deflector element 30. The fan assembly 40 may also include a filter system to capture contaminants drawn into the blower box 46. The fan assembly 40 is supported by the shield assembly 34. Air is drawn into the blower box 46 through a plenum 50 situated within a portion of the shield assembly 34.

The volume per unit time of air directed onto the rotating deflector element 30 to reduce the formation of artifacts in the recorded image is dependent upon many factors. These factors may include, for example, the rotational speed of the spin motor 32, the configuration of the rotating deflector element 30, and the type of radiation source 24 and/or optical system 26 used to produce and focus the imaging beam 22. Other factors may also influence the required amount of air. Thus, the specific amount of air required to reduce the formation of artifacts in the recorded image may vary between imaging systems. For example, in the SelectSet Avantra 25 XT imagesetter, available from the Agfa Division, Bayer Corporation, which includes a spin motor rotating at 45,000 rpm, it has been found that a stream of air of about 40 cfm is sufficient to reduce the formation of artifacts in a recorded image.

Although described above in terms of a specific type of fan assembly 40, it should be clear to those skilled in the art that other types of fan systems, having different structure and/or operation, may be used to develop and direct the stream of air 42 onto the rotating deflector element 30 of the beam deflection assembly 26 without departing from the intended scope of the present invention as defined by the claims. Further, other types of air displacement systems may be used to produce the stream of air 42.

Figure 3:
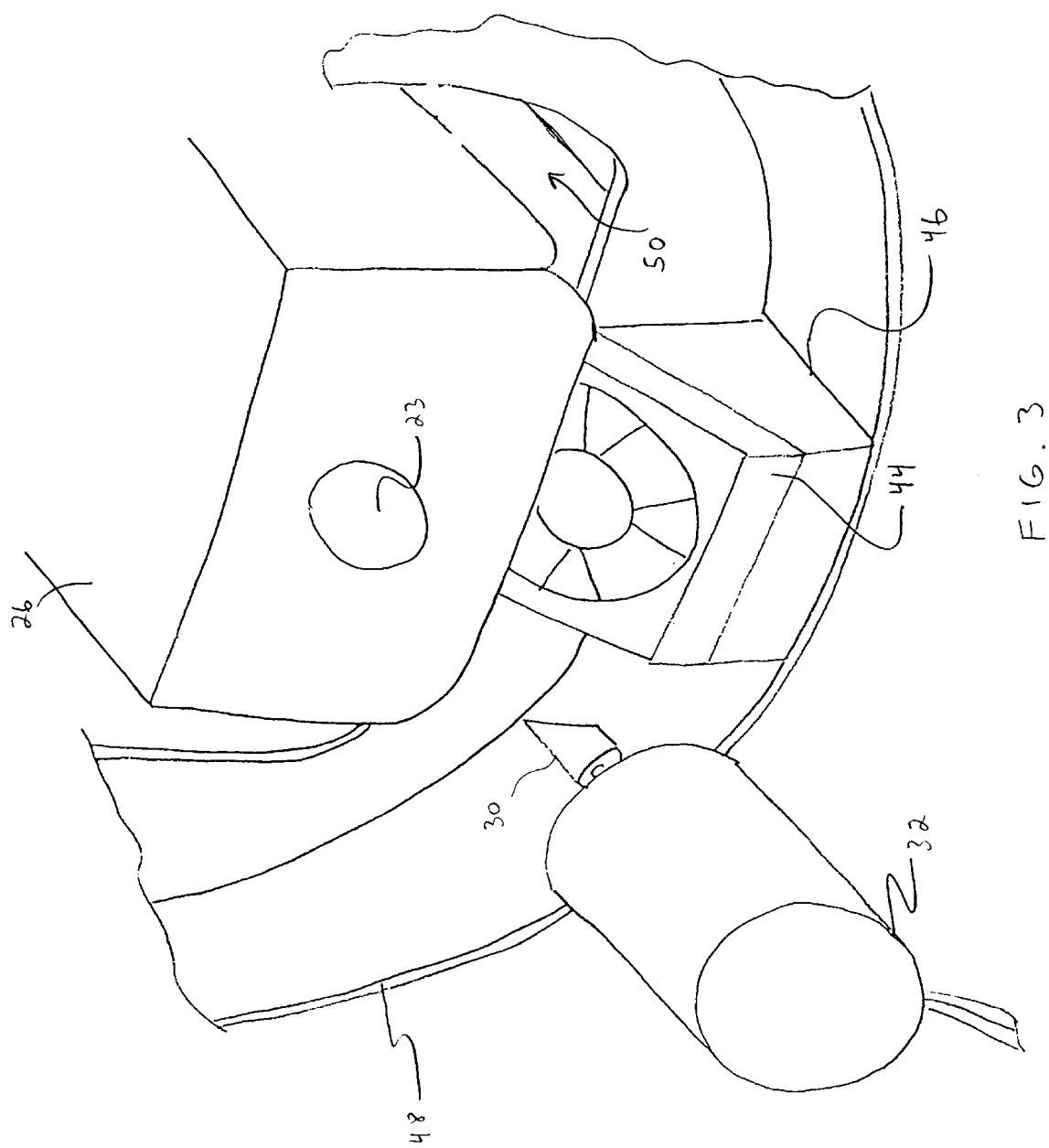
FIG. 3 is an enlarged view of the fan assembly.

The fan assembly 40 and portions of the imaging system 10 are illustrated in greater detail in FIG. 3.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. An apparatus comprising:
an air displacement system including a fan assembly for directing a stream of air onto a rotating deflector element of an imaging system.

2. The apparatus according to claim 1, wherein the stream of air reduces production of artifacts in an image recorded on a supply of recording media by the imaging system.

3. The apparatus according to claim 1, wherein the fan assembly includes a blower box and a fan mounted on the blower box.

4. The apparatus according to claim 1, wherein the air displacement system is configured to distribute a substantially uniform amount of air around the rotating deflector element.

5. An imaging system comprising:
a laser system for generating an imaging beam;
a beam deflection assembly for deflecting the imaging beam across a supply of recording media to produce a scan line, the beam deflection assembly including a deflector element for deflecting the imaging beam, and a spin motor for rotating the deflector element; and
an air displacement system including a fan assembly for directing a stream of air onto the rotating deflector element.

6. The imaging system according to claim 5, wherein the stream of air reduces production of artifacts in an image recorded on the recording media by the imaging system.

7. The imaging system according to claim 5, wherein the air displacement system is configured to distribute a substantially uniform amount of air around the rotating deflector element.

8. The imaging system according to claim 5, further including an optical carriage for supporting the laser system and the beam deflection assembly, and a system for displacing the optical carriage during imaging.

9. The imaging system according to claim 8, wherein the optical carriage further supports the air displacement system.

10. A method comprising the steps of:
recording an image onto a supply of recording media using a rotating deflector element; and
directing a stream of air onto the rotating deflector element using a fan assembly.

11. The method according to claim 10, wherein the directing step reduces production of artifacts in the recorded image.

12. The method according to claim 10, wherein the directing step further includes the step of:
distributing a substantially uniform amount of air around the rotating deflector element.

13. A method for reducing artifacts in a recorded image comprising the steps of:
recording the image onto a supply of recording media using a rotating deflector element; and
directing a stream of air onto the rotating deflector element using a fan assembly.

14. The method according to claim 13, wherein the directing step further includes the step of:
distributing a substantially uniform amount of air around the rotating deflector element.

15. A method for reducing artifacts in a recorded image comprising the steps of:
recording the image onto a supply of recording media using a beam deflection assembly; and
directing a stream of air onto a portion of the beam deflection assembly to reduce artifacts in the recorded image.

* * * * *